(No Model.) 8 Sheets—Sheet 2.
G. F. CARLIE.
CIGAR BUNCHING MACHINE.

No. 457,847. Patented Aug. 18, 1891.

(No Model.) 8 Sheets—Sheet 3.
G. F. CARLIE.
CIGAR BUNCHING MACHINE.

No. 457,847. Patented Aug. 18, 1891.

Witnesses
John Imirie
C. D. Davis

Inventor
G. Frank Carlie
By his Attorney
C. M. Alexander

(No Model.) 8 Sheets—Sheet 4.

G. F. CARLIE.
CIGAR BUNCHING MACHINE.

No. 457,847. Patented Aug. 18, 1891.

Witnesses
Inventor
G. Frank Carlie
By his Attorney (No Model.) 8 Sheets—Sheet 6.

G. F. CARLIE.
CIGAR BUNCHING MACHINE.

No. 457,847. Patented Aug. 18, 1891.

Witnesses
F. C. Gibson
C. D. Davis

Inventor
G. Frank Carlie
By his Attorneys
C. M. Alexander

(No Model.) 8 Sheets—Sheet 7.
G. F. CARLIE.
CIGAR BUNCHING MACHINE.

No. 457,847. Patented Aug. 18, 1891.

Witnesses
F. C. Gibson
C. D. Davis

Inventor
G. Frank Carlie
By his Attorneys
C. M. Alexander

UNITED STATES PATENT OFFICE.

GEORGE FRANK CARLIE, OF NEW YORK, N. Y.

CIGAR-BUNCHING MACHINE.

SPECIFICATION forming part of Letters Patent No. 457,847, dated August 18, 1891.

Application filed October 11, 1890. Serial No. 367,759. (No model.)

*To all whom it may concern:*

Be it known that I, GEORGE FRANK CARLIE, a citizen of the United States, residing at New York, in the county of New York and State of New York, have invented certain new and useful Improvements in Cigar-Bunching Machines, of which the following is a specification, reference being had therein to the accompanying drawings.

In the accompanying drawings, Fig. 4, a diagrammatical view in vertical longitudinal section, the parts being shown in the act of rolling or forming a bunch; Fig. 5, a similar view, showing the parts in another position; Fig. 5$^a$, a detail vertical sectional view of the rolling-table and rollers, showing more clearly the manner of forming the bunch.

In cigar-bunching machines it has heretofore, for various reasons, been impossible with the automatic machinery employed to measure off the bunch-fillers of uniform quantity and compactness, so that in consequence thereof machine-made cigars are usually not of a uniform size and density. Among the reasons that may be assigned for this defect in the mechanism now employed is the fact that it is not always possible to stop the action of the feeding device at the precise point necessary, thereby rendering it impossible to supply the same quantity of filler to the forming devices at every operation, and the difficulty is increased by the reason of the fact that at times the tobacco is more moist than at other times, thereby rendering it more compressible and permitting of a larger quantity being forced into the measuring device.

The present invention has for its essential object the provision of means whereby the defects and insufficiencies of the machines heretofore in use may be cured and obviated; and to this end it consists in providing improved and simple means for accurately weighing off the precise quantity required for each bunch, whereby cigars having a uniform weight and size may be produced, as will more fully hereinafter appear.

It also has for its object the provision of improved means for accurately making bunches consisting of more than one kind of filler, the desired quantity of the different fillers being accurately and rapidly weighed off separately, as will more fully hereinafter appear.

It also has for its further object the provision of improved means whereby the same machine may be employed to make different kinds of bunches, as will more fully hereinafter appear.

The invention has other minor objects in view, which will fully appear in the course of this specification.

I will now proceed to describe the specific construction and operation of one form of my invention; but I desire it understood that I do not limit myself to the precise construction and arrangement of devices shown, inasmuch as they may be changed in various ways without in the least departing from the spirit of the invention.

In the drawings annexed, A designates a table, of suitable material, supported upon frames A' resting upon the floor. Journaled in bearings on this frame near the floor is a transverse drive-shaft A'', provided at one end with a loose belt-wheel A''', over which latter the driving-belt passes.

Adjacent to the inner side of the belt-wheel and mounted on the shaft is a clutch-disk $a$, which may be forced into engagement with the belt-wheel by means of a treadle $a'$, connected by a rod to a lugged disk $a''$ on the shaft between the frame and the clutch-disk, and thereby cause the drive-shaft to revolve with the belt-wheel. This clutch mechanism is of the usual description, and I do not deem a further statement of its construction and operation necessary.

Upon the shaft A'' near one end are secured two sprocket or chain wheels $b\,b''$, over which run, respectively, the chains $b'\,b'''$, the latter chain passing up over a larger sprocket-wheel $c'$, mounted loosely upon a transverse shaft $c$, journaled in the frame under the table. The other chain $b'$ passes up over a series of four sprocket-wheels $d, d', c'',$ and $d''$, mounted upon transverse shafts journaled in bearings on a part $c'''$ of the frame of the machine under the table, top wheels $d\ d'\ d''$ being loosely mounted upon these shafts and the wheel $c''$ being keyed in its shaft.

Figure 8:
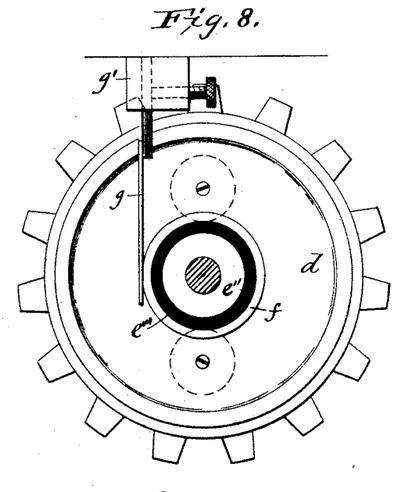
Fig. 8, a side elevation of one of the electric clutches.
Figure 9:
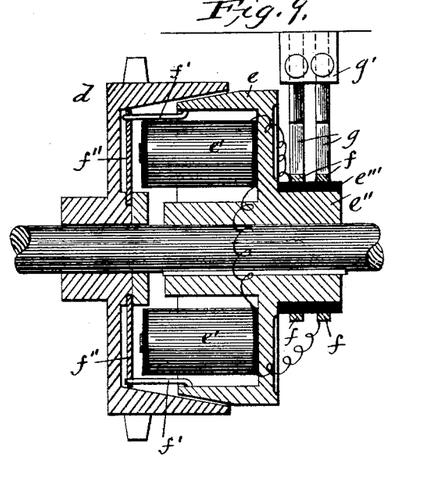
Fig. 9, a vertical sectional view of the same.

Each of the wheels $c'\,d\,d'\,d''$ forms a part of an electric clutch, one of which is shown in Figs. 8 and 9, all the clutches being similarly constructed. Each of the wheels is formed on a short cylinder open at its inner end and beveled outwardly on its interior, and adjacent to the open end of this cylinder is securely keyed on the shaft a clutch-cylinder $e$, beveled off upon its exterior to correspond with the interior bevel of the wheel-cylinder. The clutch-cylinder has its beveled end inserted in the open end of the wheel-cylinder and is provided with pins $f'$, which engage holes or notches in a circular or other shaped armature $f''$, mounted loosely upon the hub of the adjacent wheel-cylinder and adapted to permit the same to revolve independently thereof, the said armature working loosely in an annular groove in the said hub.

Electro-magnets $e'\,e'$ are secured inside the clutch-cylinder $e$ and have their poles terminate within close proximity to the armature $f''$. The two ends of the magnet-wire are connected, respectively, to rings $f\,f$, mounted upon an insulated sleeve $e'''$, secured upon the hub $e''$ of the clutch-cylinder. Spring-brushes $g\,g$, adjustably secured to an insulating-block $g'$, mounted upon the frame, bear upon the rings $f$ and make electric contact therewith. If this clutch-cylinder be brought into an electric circuit while the wheel $d$ is revolving, it will be observed that the magnets will be energized (the current passing down one brush through the ring upon which the brush bears and in through the connecting-wires to the magnets and out again through the other ring and brush) and the armature $f''$ attracted and drawn toward the magnets, thereby causing the bevel clutch-cylinder to bind in the wheel-cylinder and be carried around therewith, thus rotating the shaft on which the wheel-cylinder is loosely journaled. The pins $f'$ serve to prevent the armature rotating independently of the magnets, thereby enabling the clutch to be engaged and disengaged instantaneously, which result could not be as effectually attained if the armature revolved in front of the magnets, as is evident. It is obvious that any number of magnets may be employed, two only being shown in the present instance. These clutches have each independent connections with the battery and weighing-scale, which will be hereinafter described. The construction of this clutch is not sought to be covered in this application.

The frame $c'''$ is extended up above the table and supports a hopper C, which has its front and rear sides inclined or converging toward its lower discharging end. This hopper is open at its upper and lower end and is divided transversely by a vertical partition $g''$, forming two hoppers or compartments C' C''. In each compartment are two brush-cylinders $h\,h'$, which extend transversely of the hopper and have their shafts journaled upon the frame $c'''$. In each compartment the brush-cylinder $h'$ is arranged above and a little to one side of the lower brush-cylinder and is adapted to rotate somewhat faster than the same, both brush-cylinders revolving in the direction indicated by the arrows in Figs. 4 and 6. The lower cylinder $h$ in the compartment C'' is driven by a belt or cord $h''$, which runs upon a grooved pulley $i$, secured upon the other end of the shaft of wheel $d''$ and passes up over a pulley $i'$, secured on the shaft of the said cylinder $h$, this belt being crossed to rotate the brush-cylinder in the proper direction. The upper cylinder $h'$ in the compartment C'' is rotated by a belt $i''$, connecting the grooved pulley $j$ on the shaft of the lower cylinder with the grooved pulley $i'''$ upon the shaft of the said upper roller, as shown in full lines in Fig. 2 and in dotted lines in Fig. 1. A pulley $k$ on the opposite end of the shaft of wheel $d'$ is connected to a pulley $k'$ upon the shaft of the lower cylinder in compartment C' by means of a driving-belt $j'$, and another pulley on the shaft of the said roller is connected by a short belt $k''$ with a grooved pulley $k'''$ upon the shaft of the upper roller. Thus it will be seen that the feeding-cylinders in compartment C' are rotated by means of the shaft of wheel $d'$, and the cylinders in the other compartment derive their rotation through the shaft of wheel $d''$. All that is necessary, therefore, to cause either of the compartments to feed the filler is to throw either of the clutches of the wheels $d'$ $d''$ into engagement, whereupon motion will be imparted to the rollers and the material will be forced out through the bottom of the hopper onto the belts below. The lower cylinders serve to force the material down and out and, revolving at a less speed than the upper cylinders, serve to prevent choking and keep the filler straight. A spring-plate is secured in each of the compartments and made adjustable, by means of set-screws $l'$, to and from the lower cylinders $h\,h$, whereby the quantity of filler fed may be regulated.

Figure 1:
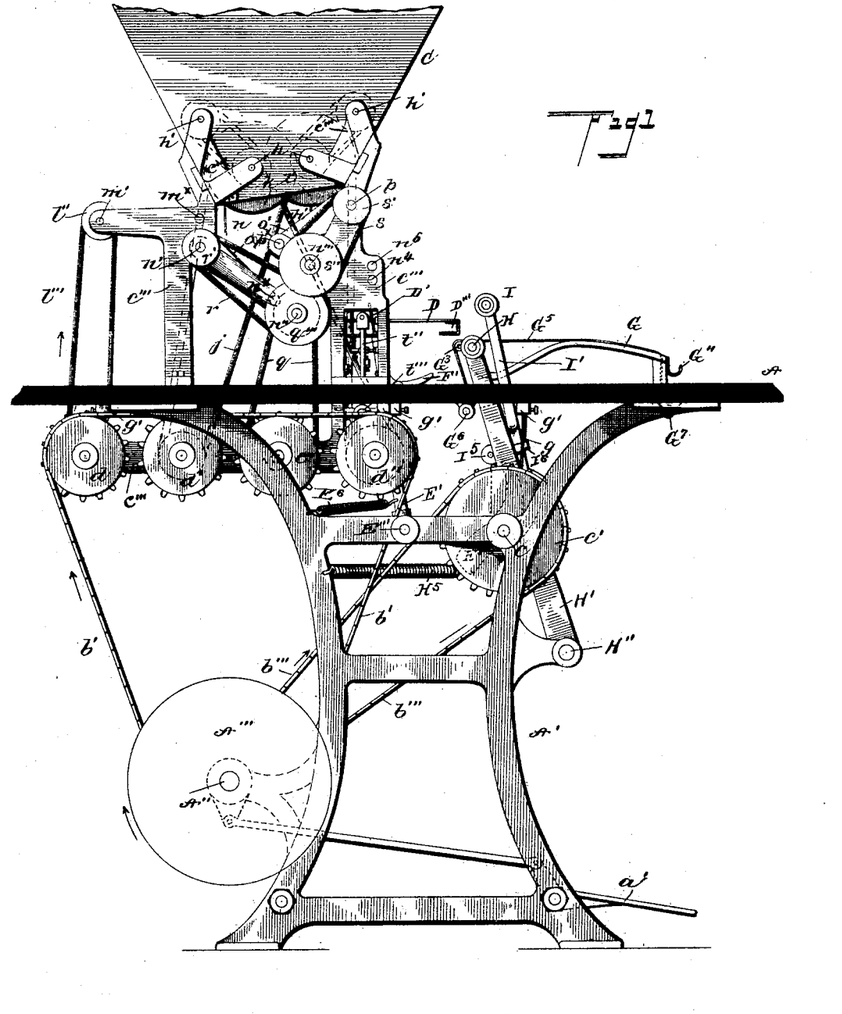
Figure 1 represents a side elevation of my improved cigar-bunching machine complete.
Figure 6:
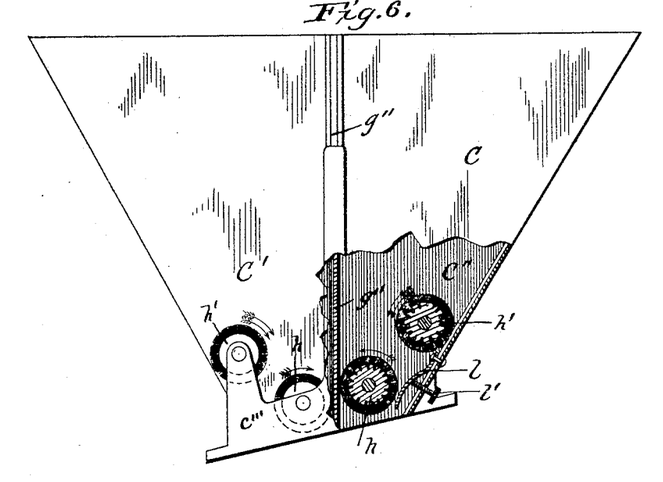
Fig. 6, a detail side elevation, partly in section, of the hoppers.
Figure 7:
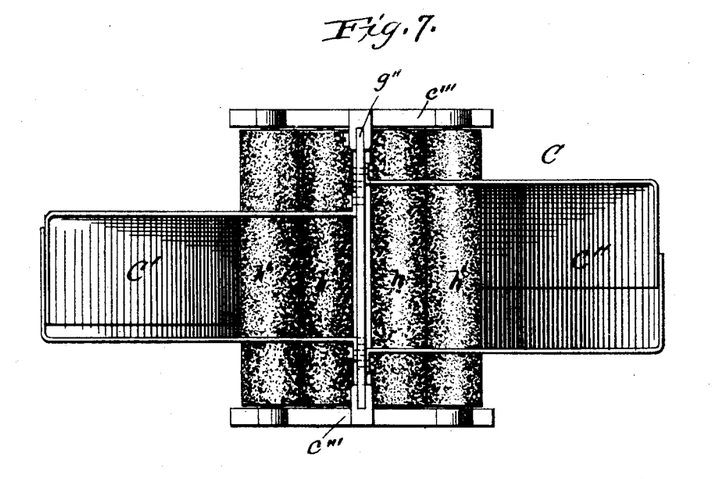
Fig. 7, a plan view thereof.

Instead of making the sides of the compartments stationary, as shown in Figs. 1 and 4, I may arrange the side walls thereof adjustable bodily with respect to each other, whereby the filler may be fed to the conveying-belts at any point across the same that may be desired, thereby enabling the operator to vary the shape of the cigar-bunch, as is evident. One way of accomplishing this is shown in Figs. 6 and 7, Sheet 6, where the division-plate $g''$ is secured at its opposite vertical edges to a suitable portion of the frame, and the respective walls of the compartments are adjustably bolted to this plate. The inclined walls of each of the hoppers overlap each other, so as to prevent the escape of the filling material, and the brush-cylinders work through circular openings in the side walls. It will be thus observed that by adjusting the walls of the compartments to or from each other the feeding-aperture may be regulated in length, and by adjusting both the walls toward one side or the other the operator may throw the filler toward one or the other end of the cigar as he desires, and thereby form the swell in the same at either end, or, as is most usual, in the middle thereof. When adjustable sides are employed, openings therein may be made for the passage of the ends of the plates $l$.

A belt or cord $l'''$ connects a grooved pulley $l''''$, secured upon the opposite end of the shaft of wheel $d$, with a pulley $l''$, secured upon the end of a transverse shaft or roller $m'$, journaled in a portion of the frame $c'''$ above. An endless feed-apron $m$ travels upon this roller $m'$ and a similar roller $m^x$ journaled in the frame near the lower end of the hopper, this apron preferably working in a substantially horizontal position. This feeding-apron is operated to feed the leaves of the filler to the weighing mechanism by simply engaging the clutch of the wheel $d$ with the said wheel, motion being transmitted through the medium of the belt $l'''$. The leaves of the filler are placed upon the upper surface of the apron and are carried rapidly in and thrown against a shield $n$, depending from a portion of the frame $c'''$, by which they are straightened and directed to the transmitting-aprons below. This shield or guard extends across the machine directly in the rear of the apron $m$, as shown. The leaves of the filler before they are fed into the machine are cut the desired size and shape, usually rhomboidal or diamond-shaped, so that as they strike the shield they will be straightened thereby in case they are not fed properly.

Under the opening of the compartment $C'$ of the hopper and the inner end of the feeding-belt $m$ is a downwardly-inclined endless transmitting-apron $o$, traveling in the direction indicated by the arrow upon a pair of transverse rollers $n'$ $n^x$, journaled in the frame. A belt $q$ transmits motion to a roller $n''$, journaled in the frame, from a grooved roller $q'$, secured upon the shaft of the wheel $c''$, the belt passing over a pulley $q''$ upon the shaft of the said lower roller $n''$. Motion is communicated to the shaft $n'$ by means of a belt $r$, which passes over pulleys $q'''$ and $r'$, secured, respectively, upon the said roller $n''$ and shaft $n'$. Another transmitting-apron $o'$ is mounted upon transverse rollers or shafts $p$ $p$, journaled in the frame. This apron is located directly under the compartment $C''$ and inclined inwardly and downwardly and terminating over the apron $o$, so that material deposited upon it from said compartment will be emptied upon the said apron $o$. Motion is imparted to the roller $p$ by means of a belt $s$, which travels upon and connects a pulley $s'$, (upon the said roller,) and a pulley $s''$, secured upon a shaft or roller $n'''$, this latter roller being journaled in the frame at a point above the roller $n''$ and provided with a gear-wheel $t$ upon its opposite end intermeshing with a similar gear upon the said roller $n''$, whereby it derives its motion. An outwardly-traveling apron or belt $o'''$ is mounted upon transverse rollers or shafts $n''$ $n^6$, this belt being slightly upwardly and outwardly inclined and having its inner end terminating under the inner end of the apron $o$, so as to receive the material therefrom and carry it outward. This apron derives its motion from the aforementioned belt $q$. Above the apron $o'''$ is a similarly-arranged apron $o''$, whose lower portion travels in unison with and in close proximity to the upper working-face of the said lower apron. This apron $o''$ travels upon rollers $n'''$ $n^5$, journaled in the frame, and it derives its motion through the medium of the cog-wheels heretofore mentioned.

Directly under the discharge ends of the conveying-aprons $o''$ $o'''$ is arranged a pivoted scale or weighing device D, upon which the materials from the respective hoppers are deposited or thrown by the said aprons. This scale is shown particularly in Figs. 10, 11, and 12, and to these views I shall refer in describing its construction. The scale pan or plate itself preferably consists of a wire bent back and forth to form a series of separated parallel bars running longitudinally of the machine, the ends of the wire being connected to the horizontal pivotal rod $t'$, which latter is nicely supported upon knife-edge bearings formed in vertical supports $t''$. These supports $t''$ are adjustably supported by means of set-screws in insulated openings in a transverse horizontal rod $t'''$, supported upon the frame.

Figure 10:
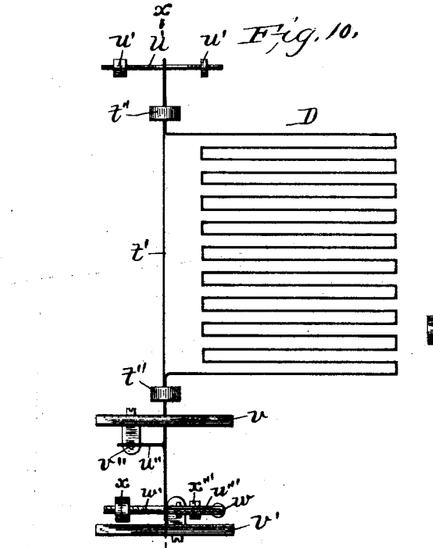
Fig. 10, a detail plan view of the scale and its attachments.
Figure 11:
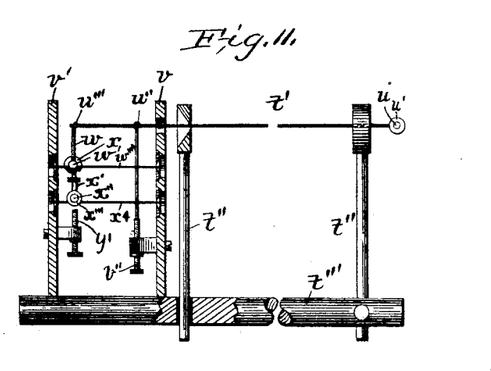
Fig. 11, a vertical sectional view of the same on the line $x\, x$ of Fig. 10.
Figures 12, 13, 14:
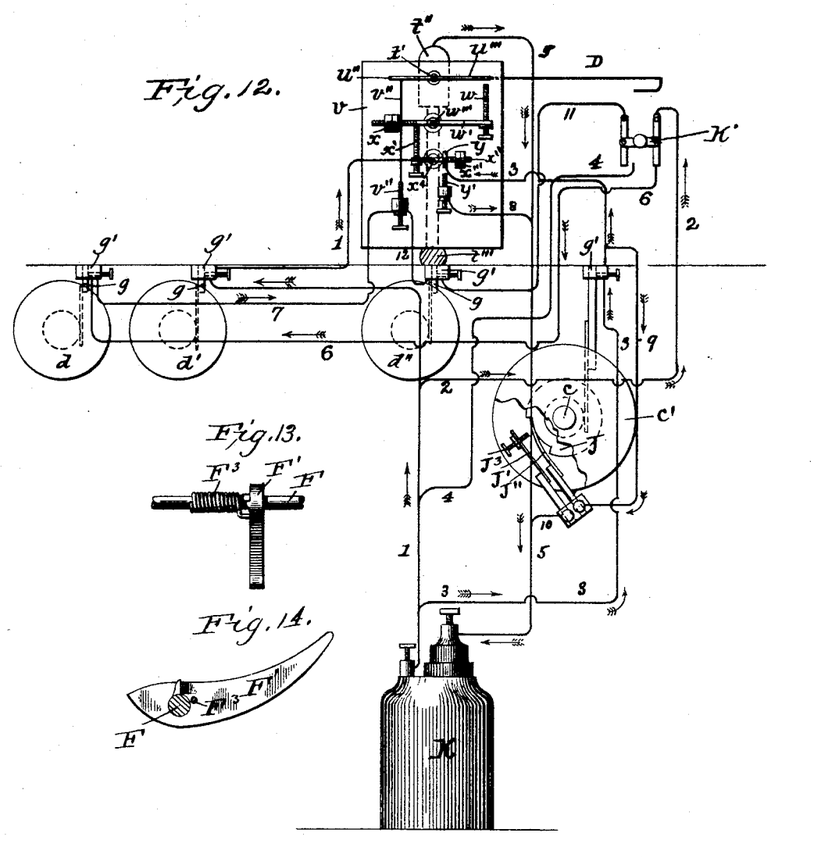
Fig. 12, a diagrammatical view showing the electric connections between the battery and the scale and electric clutches, which will be fully hereinafter described.
Figs. 13 and 14, detail views of a spring-actuated cam, hereinafter described.

Upon one end of the pivotal rod $t$ is secured a transverse bar or arm $u$, upon the opposite ends of which are tapped adjustable weights $u'$ $u'$, which serve to balance and regulate the capacity of the scale-plate. The other end of the rod $t'$ extends in between two vertical plates $v$ $v'$, and is there provided with two lateral arms $u''$ $u'''$, projecting in opposite directions, as shown. Adjustably mounted upon the plate $v$ is a vertical contact-screw $v''$, which normally contacts with the arm $u''$.

Upon a horizontal bar $w''$, pivotally supported in knife-edge bearings in the plates $v$ $v'$, is secured a horizontal lever $w'$, provided with a vertical adjustable contact-point $w$ at its rear end, which is adapted to contact with the arm $u'''$ when the scale-plate is depressed.

Upon its opposite end this lever $w'$ has tapped an adjustable weight $x$, which serves to regulate the capacity of the scale, as will more fully hereinafter appear.

Under the rod $w'''$ and supported in the same manner as the same is another rod $x^4$, which carries a short lever $x''$ provided at its forward end with a vertically-adjustable contact-point $x'$ and at its rear end with an adjustable weight $x'''$. An adjustable contact-point $y'$ is mounted upon the plate $v'$ directly under an insulated stop $y$ upon the lever $x''$, whereby when the said lever is depressed the stop will come in contact with the screw and establish electrical connection therewith for the purpose hereinafter described.

Projecting up between the parallel rods or wires of the scale near its outer end are the fingers of a comb $D'$, secured to a cross-bar $D''$, attached to the upper end of a lever E. This lever has its lower end fitted in a tube $E'$ and secured therein by a tranverse pin working in a slot in the tube, a spring $E''$ being placed in the tube under the lever, so as to keep the same normally pressed upwardly. The tube is pivoted upon a transverse shaft $E'''$ and is provided with an outwardly and downwardly projecting arm $E^4$, carrying a roller at its end. The cam $E^5$ on the shaft $c$ serves to depress the outwardly-projecting arm $E^4$ and throw the comb $D'$ outwardly as far as the end of the scale, the fingers working between the bars thereof and serving to comb or sweep off any material that may be upon the scale and deposit it upon the rolling-belt, hereinafter described. A roller $F^4$, journaled upon one side of the lever E, engages under a curved cam $F'$, pivoted upon a transverse shaft F, and serves to depress the said lever (against the action of the spring $E''$) upon its return to its normal position after the passage of the cam $E^5$ beyond the arm $E^4$. In this manner the comb is drawn down out of engagement with the scale in order to prevent it in its inward sweep from sweeping off any filler that may have been deposited upon the scale while it was at the inner end of the stroke. A spring $E^6$, Fig. 1, serves to draw the lever back after it is released by the cam $E^5$.

In order to let the roller $F^4$ pass readily over and depress the outer end of the cam $F'$ upon the outward stroke of the lever, the said cam is pivotally mounted upon its shaft and is normally held up by means of a spring $F^3$, coiled around the shaft. A lug or stop upon the shaft prevents the spring pressing the cam too far up, as shown in Figs. 13 and 14.

A hook $D''$, secured upon the under side of the end of the scale-plate, engages under the bar $D'$ when it is at the forward end of its stroke and serves to prevent the scale-plate returning to its normal position immediately after it is emptied, for a purpose hereinafter set forth.

The rolling-table G is mounted upon the table A, so that its inner end will come under the outer end of the scale, the inner end of the table being depressed transversely to form a pocket $G'$ and its rear end being provided with brackets $G''$ to receive the cigars as they are rolled and formed. The rolling-belt $G^5$ covers the rolling-table and extends lengthwise of the same, its outer end passing down through a transverse slot in the table and permanently attached to a transverse bar $G^7$, and its other end passing over a roller or bar $G^3$, mounted upon the inner end of the rolling-table, and down through a slot in the table A and is there wound around a spring-actuated roller $G^6$, which latter serves to keep the belt or cloth normally taut.

Figure 2:
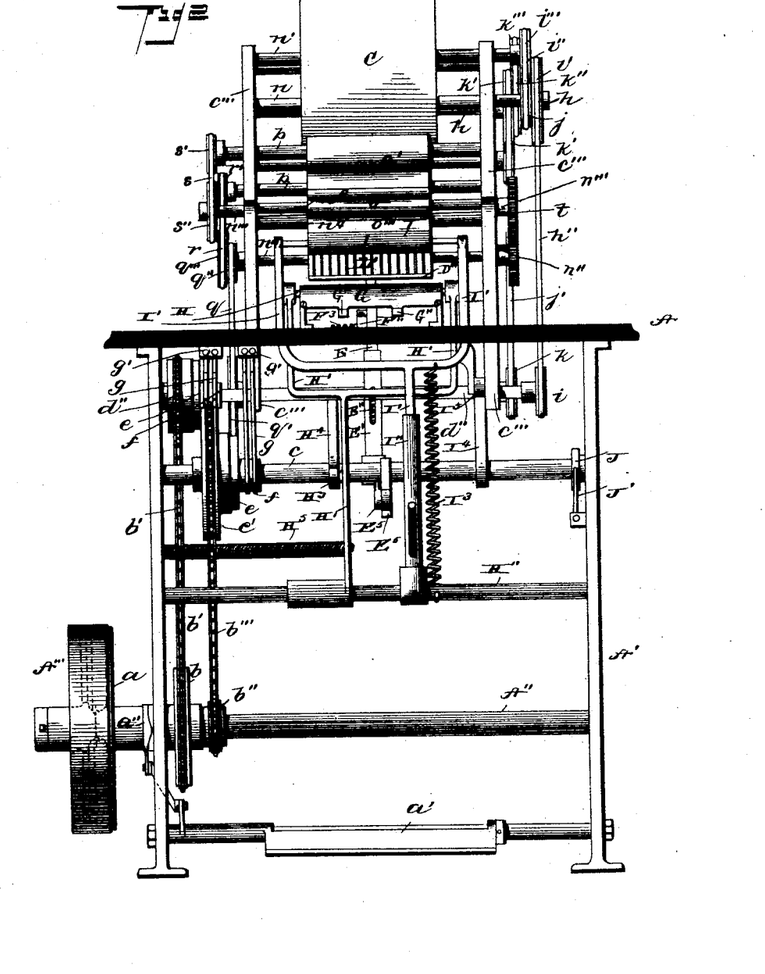
Fig. 2, a front elevation thereof, the rolling-belt being removed.
Figure 3:
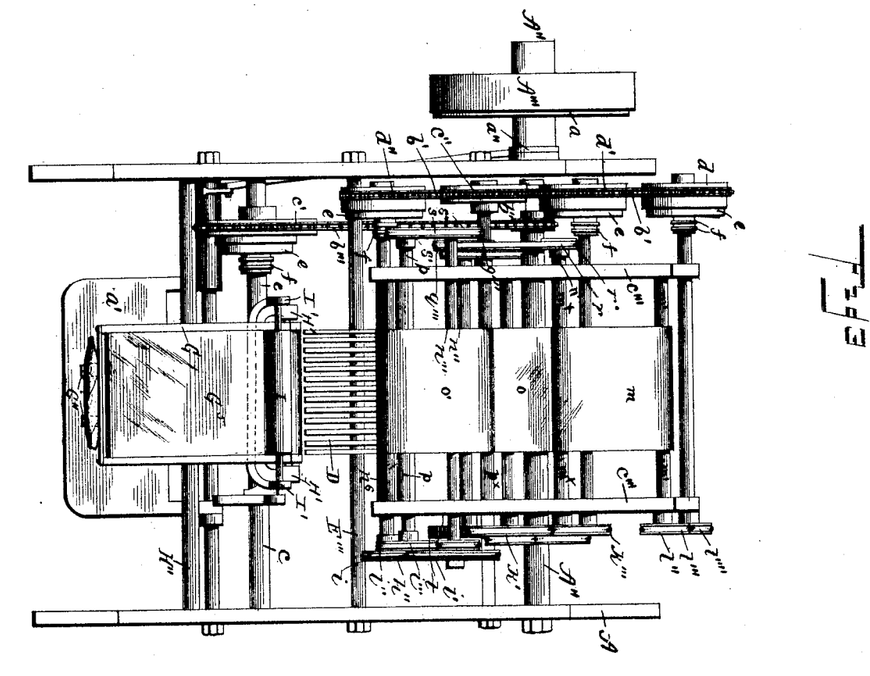
Fig. 3, a plan view, with the hoppers and table removed to better show the parts.
Figures 5, 5A:
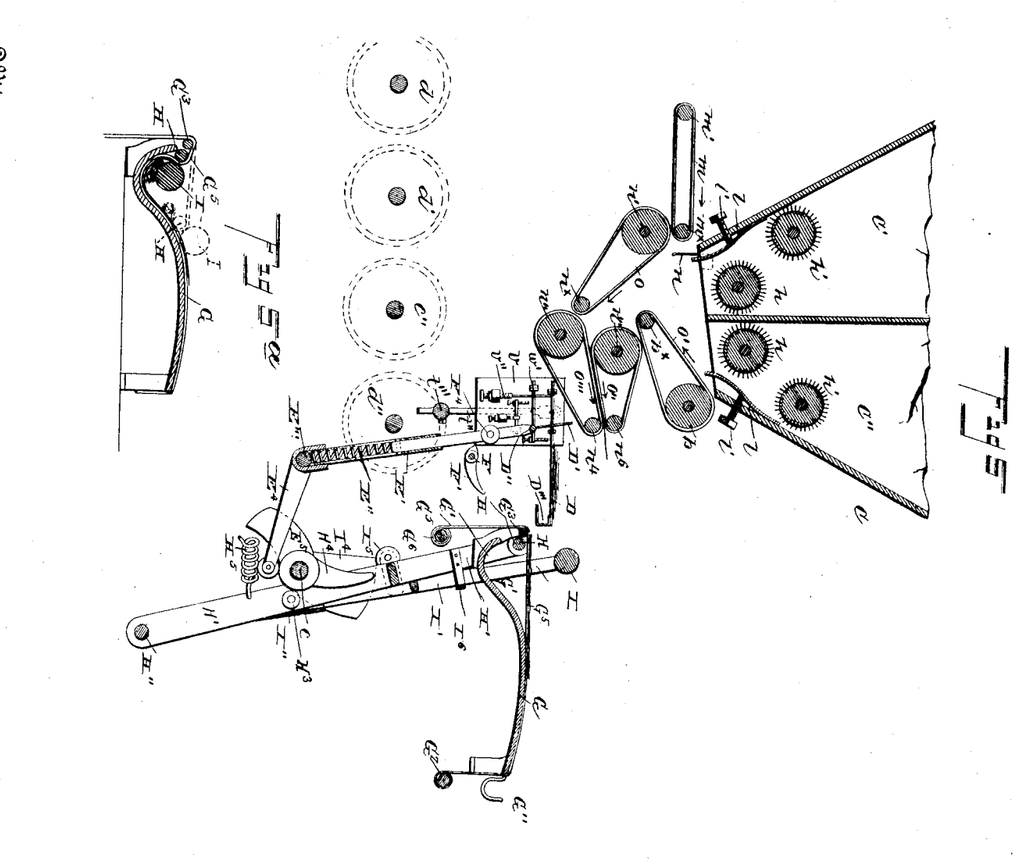

Pivoted upon a transverse shaft $H''$, secured in the frames $A'$ $A'$ at a suitable point below the table A, is a frame $H'$, bifurcated at a suitable point below the table A and having its two arms passed up through longitudinal slots formed in the same along either side of the rolling-table. Journaled in the upper ends of the arms $H'$ is a transverse bunching-roller H, which normally lies under the rolling-belt near the roller $G^3$ at the forward end of the rolling-table. A spring $H^5$ normally holds the frame $H'$ forward, and a cam $H^4$ upon the shaft $c$, operating against a roller $H^3$ upon the frame, serves to force it outwardly to the outer end of the rolling-table at the proper time. A frame $I'$, similar in construction to the frame $H'$, also has its two bifurcated arms projecting up through the longitudinal slots in the table in the rear of the said frame $H'$, the upper ends of these arms being connected by a transverse roller I above the rolling-belt. The lower end of the frame $I'$ works in a sleeve $I''$, pivoted upon the shaft $H''$. This frame is normally held down by means of a spring $I^3$, connecting it to the shaft $H''$ below. Normally this spring draws the roller down into the depression in the rolling-table and thereby forms a pocket in the rolling-belt for the reception of the filler material, as shown in Fig. 5ª. This frame works in loops $I^6$, attached to the frame $H'$, and is thereby carried back and forth with the same, while at the same time it has a limited vertical motion independently thereof. At the proper time a cam $I^4$ upon the shaft $c$ engages under a roller $I^5$, carried by the frame $I'$, and lifts the frame and its roller I up out of the pocket in the table, as shown in Figs. 1 and 2.

The operation of this rolling mechanism is as follows: When the proper quantity of filler has been deposited upon the scale and the same is depressed, the filler is swept off the scale by the comb $D'$ in the manner hereinbefore described upon the rolling-belt. Just previous to the operation of the comb the cam $I^4$ raises the roller I out of the depression in the table G and holds it up until the filling material is deposited under it upon the rolling-belt. As soon as the cam $I^4$ is past the roller I⁵ upon the frame I' the roller I is drawn down again into the depression in the table, the filler upon the belt being depressed with it. Then the cam H⁴ strikes against the roller H³ and forces the frames H' I', carrying the rollers, to the outer end of the table G, which action serves to roll and form the bunch and deposit it in the hooks G" at the outer end of the table. It will be perceived that as the rollers H and I are forced rearwardly the latter roller is carried up out of the depression G' by the curvature of the table, and it rolls along upon or near the surface thereof immediately in front of the roller H, thereby serving to hold the binder in place upon the belt while it is being wrapped around the filler, as shown in Fig. 5ᵃ. When the whip H starts rearwardly and the roller I is pushed up out of the depression, the bunch is clamped in a loop or bight formed in the rolling-belt by the rollers, and as the rollers move rearwardly the bunch is tightly clamped and subjected to a rolling action in the bight or loop thus formed, as is evident. Upon the shaft c at a suitable point is fixed an insulated disk J, having its periphery cut away at suitable points, as shown in Figs. 2 and 12. Adapted to bear upon the periphery of the disk is a spring or brush J", adjustably secured to the frame and insulated. Secured alongside the spring or brush J" is another similar spring J', which is also insulated and carries at its outer end an adjustable contact-screw J³, adapted to bear against and establish electrical contact with the spring J" when the same is forced out of the recess in the disk in which it normally rests. The revolution of the disk forces the spring J" out of its recess and makes electrical connection with the other spring, for a purpose set forth hereinafter. In practice the hopper C' is filled with "scrap" and the other hopper with "long filler," and the properly-cut leaves of the regular "Spanish filler" are fed into the machine by an operator upon the feed belt or apron m. To start the machine, the operator at the rear of the machine presses upon the treadle and thereby forces the clutch into engagement with the loose driving-pulley. As the shaft A" revolves, the chains communicate motion to the sprocket-wheels, the wheels d d' d" c' revolving loosely upon their shafts and wheel c" carrying its shaft around with it. Power is conveyed to the carrying and straightening belts o o' o" o''' through the medium of the system of driving-belts described, these belts being kept constantly and rapidly traveling in the direction indicated by the arrows.

In Fig. 12 is shown the diagram of the electrical connections, which will now be described. The positive conductor 1 of the battery K is connected directly to the brushes of the clutch of wheel d', and from thence it extends to and is connected to the lower lever x" of the scale. A branch 2 of this main wire is connected to one pole of an ordinary switch K', while another branch 4 is connected to the other pole of the switch, while still another branch 3 extends to and is connected to the brushes of the clutch on shaft c, whence it extends to the insulated stop y upon lever x'''. The negative wire 5 is electrically connected to the scale through one of its posts t", the posts being insulated in bar t'''.

In operation, when the current is turned on it passes through wires 1 and 2 and the right pole of switch through wire 6 to the brushes and magnets of the clutch of wheel d, thence through wire 7 to contact v", and thence through scale and wire 5 to the battery. The passage of the current through the clutch-magnets causes the clutch to engage the sprocket-wheel d and impart motion to the feed-apron m. The Spanish filler is placed upon belt m and thereby carried into the machine and deposited upon the conveying-aprons, which instantly deposit it upon the scale-plate, leaf upon leaf. As soon as the required number of leaves have been deposited upon the scale, (the capacity thereof being regulated by the adjustable weights u' u',) the same is depressed, thereby breaking the contact between arm u" of the scale and the contact-screw v" and instantly releasing the clutch of wheel d and stopping the feed-apron m. When the first part of the bunch is thus weighed off, the scale falls a short distance or until its arm u''' rests upon the contact-screw w, where it rests until the second part or scrap is weighed. The instant the contact is made between the scale and the screw w the current passes up through the wire 1, the brushes, and magnets of the clutch of wheel d', thereby causing the clutch to engage the same, thence through the levers x" and w' and their contact-screws, and thence back to battery through the scale and wire 5. The throwing of the clutch of the wheel d' into engagement starts (through the medium of the belt j and the connected mechanism) the feeding-rollers in hopper C', whereupon a suitable quantity of scrap-tobacco is deposited upon the conveying-belts below, which transmit and deposit it upon the scale. When the required amount of scrap has been deposited upon the scale, (the amount of scrap being governed by the adjustable weight x upon the lever w',) the same is further depressed, thereby breaking the contact between the lever w' and the screw x', the lever of the latter coming to a rest with its insulated stop y resting upon the stationary contact-screw y' and stopping the action of the scrap-feeding devices. When the stop y contacts with the screw y', the current is again shifted, so as to pass through wires 1 and 3 and through the brushes and magnets of the clutch on shaft c to the said stop y, and from thence through screw y' and wires 8 and 5 to the battery, the passage of the current through the clutch on shaft c causing the same to engage and revolve with the loose wheel c'. The first action of the shaft c is to cause the comb-lever to move backward and sweep the tobacco on the depressed scale off upon the rolling-belt underneath the uplifted roller I, whereupon the rolling mechanism hereinbefore described commences to operate and finishes the bunch and deposits it in the hooks G''. To prevent the immediate return of the scale after it is relieved of its load, the hook D''' engages under the comb-bar D'', the scale not being permitted to return to its normal position until the bar D'' has passed on its return stroke the end of the hook, as is obvious. Should the scale be permitted to return immediately, the lever $x''$ would be lifted from its screw $y'$, and thereby break the circuit and stop the shaft $c$. When the scale is released and allowed to return to its normal position, all the parts of the scale resume their normal position and the operation of the feed-apron $m$ and other parts continued, as before. By the time the scale is released from the comb-bar and the circuit just described is broken the recessed insulated disk J will have revolved sufficiently to force the inner spring J'' out of the recess against the screw $J^3$, thereby closing the circuit formed by the wires 1, 3, 9, and 10 and the brushes and magnets of the clutch on shaft $c$ and serving to continue the revolution of the said shaft to complete the rolling operation. When the shaft $c$ has made a complete revolution, the spring J'' again drops in its recess and stops the shaft by breaking the last-named circuit. When it is desired to make the bunches of the long filler contained in hopper C'' and the scrap, the switch K is shifted, so as to bring its left bar into contact with the end of wire 4 and disconnect the other bar from wire 6, whereupon the current will be directed through wires 1, 4, and 11 to the brushes of clutch of wheel $d''$, and from thence through wire 12, stop $v''$, scale and back to battery, thereby starting the feeding of the long filler from the hopper C'' through the medium of the belt mechanism heretofore described. It will be observed that the belts or aprons $o$ $o'$ $o''$ $o'''$ have no connection with the electrical clutches, but are kept constantly revolving by the fixed wheel $c''$ and the connected gearing and belting.

Having thus fully described my invention, what I claim, and desire to secure by Letters Patent, is—

1. In a cigar-machine, the combination of a frame, a transverse stationary partition $g''$, the compartments C' C'', secured upon opposite sides of the said partition, the sides of said compartments being made adjustable with respect to each other, a pair of transverse brush-cylinders in each of the compartments and journaled on the frame, one brush-cylinder of each pair being journaled above the other roller of the same pair, transverse plates adjustable with respect to the lower brush-cylinders, and means for receiving the fillers and bunching them, substantially as described.

2. The combination of two distinct feeding mechanisms for feeding different materials, a scale-plate for receiving the said materials, and means controlled by the movement of the scale-plate for stopping and starting the said distinct feeding mechanisms, whereby definite quantities of each of the two materials may be weighed off on the scale, substantially as described.

3. The combination, in a cigar-bunching machine, of a scale, two distinct electrically-controlled mechanisms for feeding different materials to the said scale, and means controlled by the movement of the scale for successively closing and breaking the circuits of the said feeding mechanisms, whereby definite quantities of the two materials will be weighed off upon the same scale, substantially as described.

4. The combination, in a cigar-bunching machine, of a scale, a feeding mechanism for feeding material to the said scale, driving mechanism for the said feeding mechanism, an electric clutch for engaging the driving mechanism, and means controlled by the movement of the scale for closing the electric circuit of the clutch and stopping the feeding mechanism when a certain quantity of material has been fed to the scale, substantially as described.

5. The combination of a feeding-apron and a depending shield or guard $n$ at the inner end thereof to straighten the leaves and direct them downward, substantially as described.

6. The combination, in a cigar-bunching machine, of a weighing-scale pivotally supported, two distinct feeding mechanisms controlled by the said scale, so as to operate, successively, to feed material, and a system of continuously-traveling belts intermediate the said feeding mechanism and the scale to straighten and deposit the material fed upon the scale, substantially as and for the purpose described.

7. The combination, in a cigar-bunching machine, with a weighing-scale, two distinct feeding mechanisms, two distinct electric clutches adapted to engage and operate the feeding mechanisms successively to feed definite quantities of the different materials to the scale, and means controlled by the movement of the scale for closing and breaking the circuits of the clutches successively, substantially as described.

8. The combination, in a cigar-bunching machine, of two distinct feeding mechanisms electrically controlled, a pivoted counterbalanced scale upon which the materials are successively deposited, a stationary contact-point contacting with the scale while it is in its normal position, and thereby closing the circuit of one of the feeding mechanisms, and a pivotally-supported counterbalanced lever carrying a contact-point adapted to contact with the scale when it is partially depressed and close the circuit of the second feeding mechanism, whereby definite quantities of the different materials will be sucessively deposited upon the same scale, substantially as described.

9. The combination, in a cigar-bunching machine, of a feeding mechanism, a pivoted scale for receiving the material fed, an electrically-controlled lever for clearing the scale of the material, and means for closing the circuit that controls the said lever when the scale is depressed, substantially as described.

10. The combination, in a cigar-bunching machine, of a feeding mechanism, a scale constructed of parallel bars, a lever carrying a series of fingers projecting up between the said bars, and means for automatically operating the said lever when the scale is depressed to push the material off the scale, substantially as described.

11. The combination, in a cigar-bunching machine, of a scale constructed of parallel bars, a swinging lever carrying a series of fingers projecting up between the said bars, means for automatically operating this lever when the scale is depressed, and means for depressing the said lever and fingers upon their return to their normal position, substantially as described.

12. In a cigar-machine, the combination of a weighing-scale, electrically-controlled mechanism for clearing the same when it is depressed, a rolling table, and belt to receive the material from the scale, and electrically-controlled rolling mechanism, substantially as described.

13. In a cigar-machine, the combination of a scale, means for discharging its load, rolling mechanism for receiving the load, an electric clutch engaging the said rolling mechanism, and means controlled by the movement of the scale for closing the circuit of the clutch, and thereby starting the rolling mechanism when the scale is depressed, substantially as described.

14. The combination of a curved rolling-table provided with a depression near its forward end, a rolling-belt normally drawn taut over the said table, a roller I normally forcing the belt in the said depression, a bunching-roller H, extending across the table under the belt, and means for forcing these rollers toward the other end of the rolling-table, as and for the purpose described.

15. In a cigar-bunching machine, the combination of a feeding mechanism, a scale to receive the material from the said mechanism, mechanism for stopping the feeding mechanism by the movement of the scale, a rolling mechanism, and means for automatically sweeping the bunch off the scale onto the said rolling mechanism, as and for the purpose set forth.

16. The combination, in a cigar-machine, of two distinct feeding mechanisms, a receiving-scale to receive the materials from the said feeding mechanisms, means controlled by the movement of the scale for successively operating the said feeding mechanisms, so as to feed definite quantities of the two materials thereto, rolling mechanism located adjacent to the said scale, and means for delivering the materials from the scale onto the rolling mechanism, substantially as described.

In testimony whereof I affix my signature in presence of two witnesses.

G. FRANK CARLIE.

Witnesses:
WM. BEHR,
F. M. SHEPARD.